May 4, 1926.
J. G. CAPSTAFF
1,583,653
APPARATUS FOR TAKING AND PROJECTING MOTION PICTURES
Filed Dec. 26, 1922      3 Sheets-Sheet 1
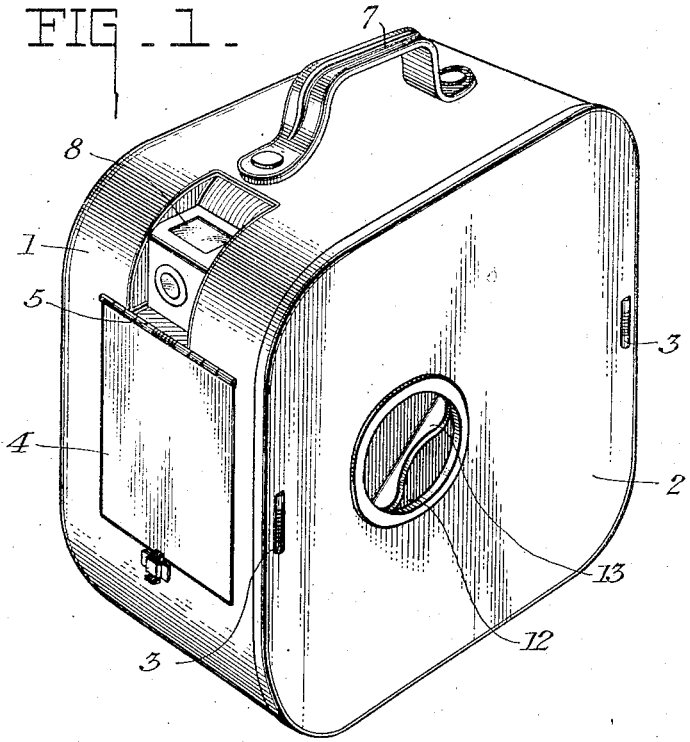
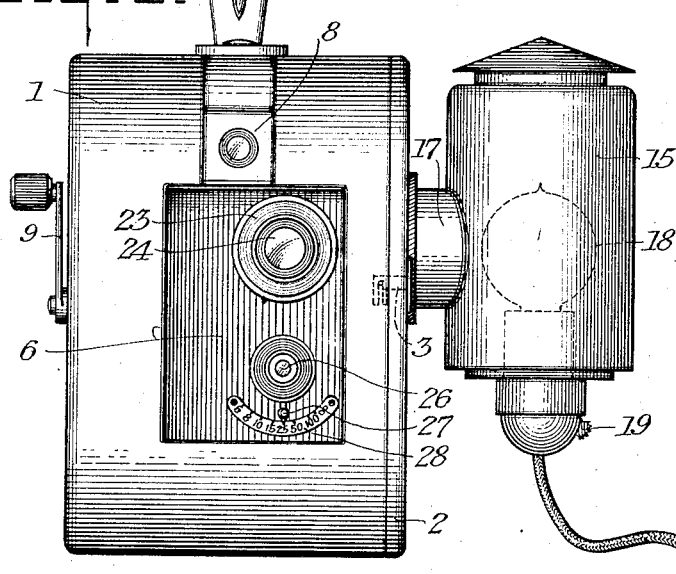
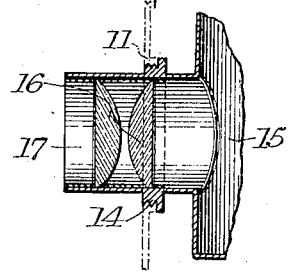
INVENTOR
John G. Capstaff
BY
ATTORNEY May 4, 1926.
J. G. CAFSTAFF
1,583,653
APPARATUS FOR TAKING AND PROJECTING MOTION PICTURES
Filed Dec. 26, 1922     3 Sheets-Sheet 2
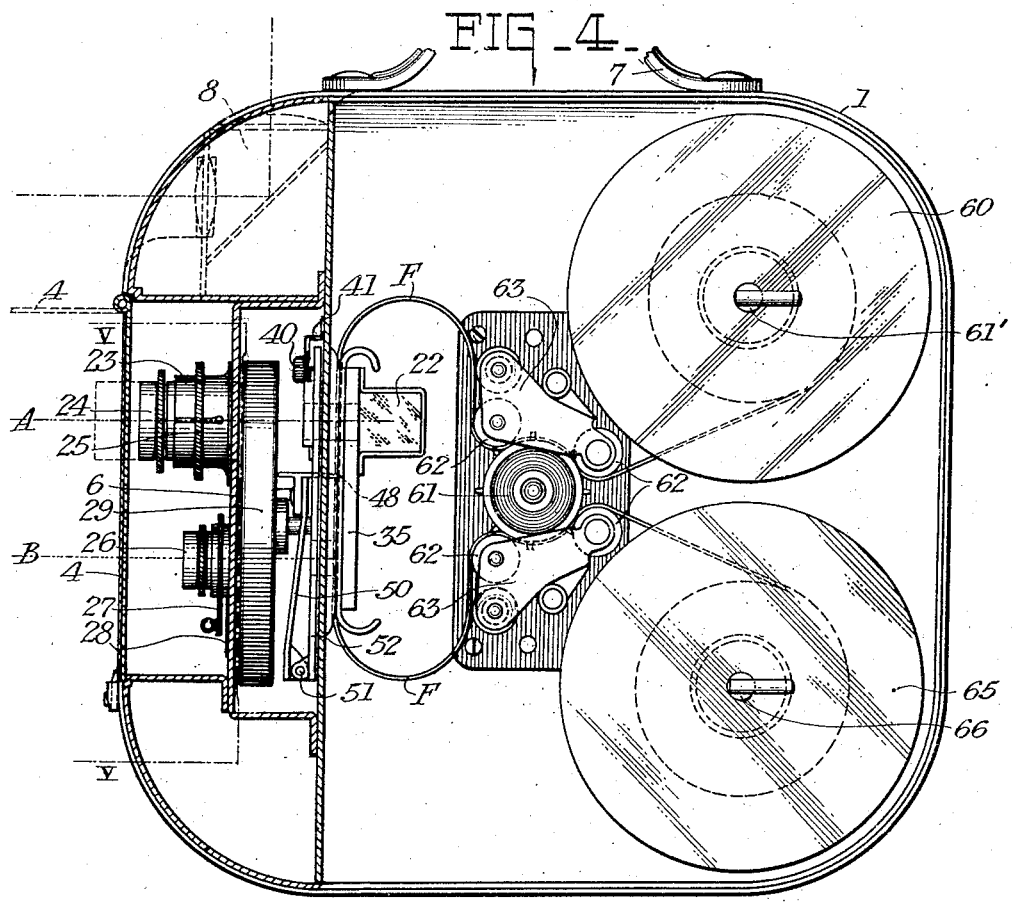
INVENTOR
John G. Capstaff,
BY
ATTORNEY May 4, 1926.
J. G. CAPSTAFF
1,583,653
APPARATUS FOR TAKING AND PROJECTING MOTION PICTURES
Filed Dec. 26, 1922
3 Sheets-Sheet 3
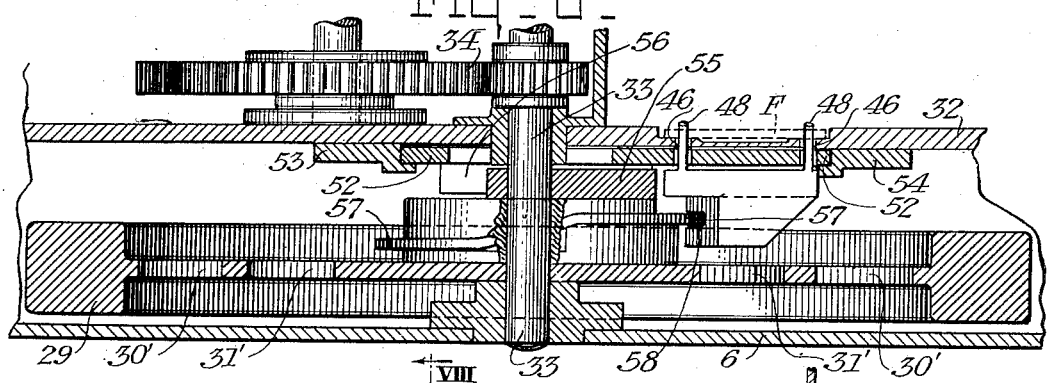
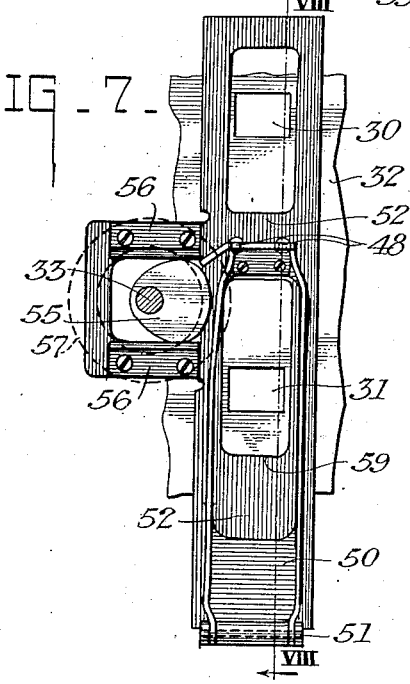
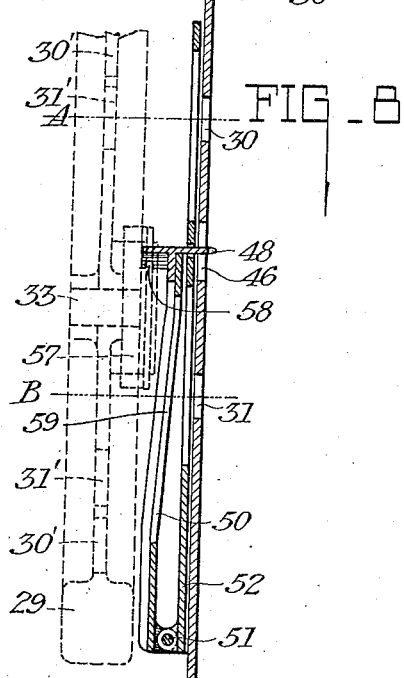
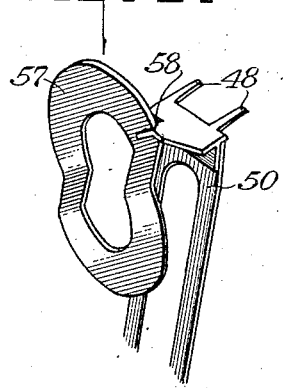
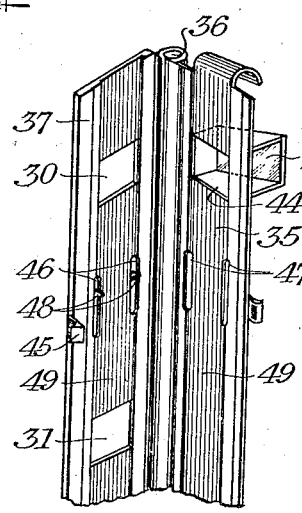
INVENTOR
John G. Capstaff,
BY
ATTORNEY Patented May 4, 1926. 1,583,653

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

APPARATUS FOR TAKING AND PROJECTING MOTION PICTURES.

Application filed December 26, 1922. Serial No. 609,045.

*To all whom it may concern:*

Be it known that I, JOHN G. CAPSTAFF, a subject of the King of Great Britain, residing at Rochester, in the county of Monroe and State of New York, have invented certain new and useful Improvements in Apparatus for Taking and Projecting Motion Pictures, of which the following is a full, clear, and exact specification.

This invention relates to photography and particularly to motion picture cameras and projectors; and it has for its object to provide a taking camera which may be converted into a projecting camera by the addition of a lamp house; to provide a combined taking and projecting machine in which the film is threaded through a single gate for either taking or projecting; to provide a suitable shutter for taking and projecting; to provide a single pulldown which will accurately draw the film past the two gate openings; to provide an auxiliary shutter by which the projection gate may be rendered light tight. Other objects will appear from the following specification, the novel features being pointed out in the claims at the end of the specification.

In the drawings wherein like reference characters denote like parts throughout:

Fig. 1 is a perspective of one embodiment of my machine ready to be used for taking pictures;

Fig. 2 is a front elevation of the same machine equipped with a lamp house for projecting pictures;

Fig. 3 is a fragmentary detail in section of a portion of the lamp house;

Fig. 4 is a part section and part side elevation of my machine;

Fig. 5 is a section on line V—V of Fig. 4;

Fig. 6 is a section on line VI—VI of Fig. 5;

Fig. 7 is a fragmentary front elevation of parts of the shutter;

Fig. 8 is a section on line VIII—VIII of Fig. 7;

Fig. 9 is a detail perspective of parts of the shutter mechanism; and

Fig. 10 is a perspective of parts of the gate removed from the camera.

As shown in Fig. 1 the machine consists of a body portion 1 with a removable side wall 2 forming a door normally held to the body by sliding latches 3. A front door 4 is hinged at 5 to the casing and may cover the lens board 6. There is the usual handle 7, finder 8, and operating crank 9.

The door 2 is provided with a threaded aperture 11 into which a disk 12 may be screwed by the wing nut 13 when the camera is to be used for taking, or into which a nut 14 of a lamp house 15 may be screwed when the machine is to be used for projecting. The lamp house preferably carries condensers 16 in a tubular mount 17, and a lamp 18 which may be controlled by switch 19 through which current passes to the lamp through the wires 20 and 21 from a source of power. The axis of the condensers passes through a central point on the mirror 22 which directs the light beams through film F, as will be hereinafter described.

For best results in projecting the lens must be of larger aperture and of longer focal length than the taking lens. Consequently I have provided a mount 23 which permits a large aperture lens 24 to be drawn out as far as dashed lines in Fig. 4 for focusing. This mount is carried on lens board 6. A knurled ring 25 clamps the lens in the desired position.

In taking, a relatively short focal length lens is preferable, this being shown at 26 on lens board 6. A lever 27 is provided for focusing over a scale 28, such an arrangement being common practice.

A single fly wheel shutter 29 is used for both purposes, a single long slot 31′ permitting the necessary full exposures in taking, while three slots 30′ are used in projecting, as with this system flicker can be more nearly overcome than with a single or two-blade shutter. As best shown in Fig. 5 the projecting window or gate 30 and the taking gate or window 31 are both in plate 32 and in alignment with their proper shutter openings. Shaft 33 which drives the shutter is driven by suitable gearing 34, such, for instance, as is shown in the application of Julian Tessier, Serial No. 378,616 filed May 3, 1920.

The film gate 35 is hinged at 36 to the front plate 37 which is affixed to wall 32. In Fig. 10 there is shown the projecting window 30 and the taking window 31. There is a supplementary sliding shutter 38 for window 30 movable in guideways 39 by means of the operating lug 40, and held in either open or closed position by the leaf spring 41 notched at 42 and 43 to engage a portion of the operating lug 40 to retain this shutter in its set position. As is shown in Fig. 5 lug 40 is near door 2 for convenience in operating. When taking pictures this shutter must be closed to prevent the film from being fogged through the projecting lens. Behind window 30 there is a second window 44 carried in the gate 35 which registers with window 30 when the gate is closed. Behind these windows there is mounted a mirror 22 set at an angle to reflect a light beam from lamp 18 through condensers 16 out through film F and lens 24 along the dashed and dotted line A. Slots 46 in the plate 37 and registering slots 47 in gate 35 provide room for the pulldown claws 48. A spring latch 45 holds the gate 35 closed. As is customary both the plate and gate are cut out in the central part 49 so that the film F will contact outside of the picture area only, thus avoiding scratches on the film.

The pulldown mechanism consists of claws 48 carried by a frame 50 hinged at 51 to a slidable plate 52 which moves vertically on rails 53 and 54, (Fig. 5). The up-and-down movement is secured by cam 55 affixed to shaft 33 and actuating plate 52 through the flanges 56. The in-and-out movement is obtained by cam 57 actuating through slot 58 of frame 50 which is hinged at 51. The sliding plate 52 is cut away at 59 to permit the taking light beam from lens 26 to pass through the pulldown mechanism along line B.

Since a single pulldown mechanism is used and this positions the film at both gates with the same relation between the exposure area and the aperture, it is necessary that the two gates shall be spaced by an exact multiple of the height of such exposure area or field.

The film F is drawn from a supply reel 60 upon shaft 61' by a sprocket 61 being held thereon by rollers 62 of the clamp member 63. After passing through gate 35 it returns to the sprocket 61 where similar rollers 62 carried by member 63 hold it upon the sprocket from which it is wound upon the take-up reel 65 on shaft 66.

As the driving mechanism for the reel sprocket and shutter is the same as that shown in the Julien Tessier patent above cited, I will not detail this mechanism in this specification since it forms no part of the present invention.

The operation of my motion picture machine is as follows: For taking pictures the film is threaded from reel 60 over the sprocket 61 through the gate 35, back under the sprocket and on to reel 65. The supplementary shutter 38 must be carefully closed by the operating lug 40 in which position it will be held by notch 42 of spring 41. The door 2 is replaced and the camera used in the usual manner. For projecting, the film is loaded in the same way but shutter 38 is first moved to its open position. After unscrewing disk 12, the lamp house 15 is screwed into socket 11 of the door 10, and, after connecting the lamp by wires 20 and 21 to a source of power, the pictures may be projected by turning crank 9.

This construction lends itself to the production of a compact and efficiently combined taking and projecting machine, wherein a single shutter is provided for two different types of work. A single gate is provided with two windows for taking and projecting, a single pulldown is used and separate lenses of different focal lengths and of different characteristics suitable for projecting and taking respectively, are available without conscious selection by the unskilled user.

It is obvious that this invention is susceptible of a wide variety of embodiments differing materially from the one here shown by way of example and I contemplate all such equivalents and modifications as fall within the terms of the appended claims as included in the scope of my invention.

Having thus described my invention, what I claim as new and desire to secure by Letters Patent is:

1. Apparatus for the taking and projection of motion pictures and comprising an exposure gate and a projection gate, a common film guide extending past both said gates, means for advancing a single strip of film through said guide and past said gates in succession an objective in front of each gate, and means cooperating with the projection gate only to permit illumination thereof, whereby images may be projected from said gate through the corresponding objective.

2. Apparatus for the taking and projection of motion pictures and comprising an exposure gate and a projection gate, an objective in front of each gate, and means cooperating with the projection gate only to permit illumination thereof, whereby images may be projected from said gate through the corresponding objective, the objective in front of the projection gate being a greater focal length than the other.

3. Apparatus for the taking and projection of motion pictures, and comprising an exposure gate and a projection gate, an objective in front of each gate, and means cooperating with the projection gate only to permit illumination thereof, whereby images may be projected from said gate through the corresponding objective, the objective in front of the projection gate being of greater aperture than the other.

4. Apparatus for the taking and projection of motion pictures, and comprising an exposure gate and a projection gate one above the other, an objective in front of each gate, means to move a single strip film past said gates in succession, a common shutter for both gates, and means cooperating with the projection gate only to permit illumination thereof, whereby images may be projected from said gate through the corresponding objective.

5. Apparatus for the taking and projection of motion pictures, and comprising an exposure gate and a projection gate, an objective in front of each gate, a common shutter for both gates, means cooperating with the projection gate only to permit illumination thereof, whereby images may be projected from said gate through the corresponding objective, and an auxiliary shutter in front of the projection gate only.

6. In an apparatus for taking and projecting motion pictures, an exposure gate, a projection gate, shutter means whereby said gates may be periodically covered and uncovered whereby they may be used respectively for the taking and projecting of motion pictures, means whereby the projection gate only may be illuminated, and means adapted to render ineffective the exposure gate and that portion of the shutter means corresponding thereto.

7. In an apparatus for taking and projecting motion pictures, an exposure gate, a projection gate, a common rotary shutter having different openings for periodically covering and uncovering said respective gates whereby they may be used respectively for the taking and projecting of motion pictures, means whereby the projection gate only may be illuminated, and means adapted to render ineffective the exposure gate and that portion of the shutter means corresponding thereto.

8. Apparatus for the taking and projection of motion pictures, and comprising an exposure gate and a projection gate, an objective in front of each gate, the objective in front of the projection gate being of greater focal length and aperture than that in front of the exposure gate, a common shutter for both gates, means cooperating with the projection gate only to permit illumination thereof, whereby images may be projected from said gate through the corresponding objective, and an auxiliary shutter in front of the projection gate and adapted to be set in position to cover or uncover said gate.

9. Apparatus for the taking and projection of motion pictures, and comprising an exposure gate and a projection gate, an objective in front of each gate, the objective in front of the projection gate being of greater focal length than that in front of the exposure gate, a shutter mounted in front of said gates to rotate about a fixed axis, and having two concentric aperture sets, one set being adapted to pass in front of and expose one gate only, and the other set being adapted to pass in front of and expose the other gate only, an auxiliary shutter in front of the projection gate and adapted to be set in position to cover or uncover the said gate, and means cooperating with the projection gate only for illuminating the same to project images from said gate through the corresponding objective.

10. Apparatus for the taking and projecting of motion pictures, and comprising an exposure gate and a projection gate in alignment, a common pulldown mechanism for drawing film through both gates in succession, a common shutter for both gates, an objective in front of each gate, the objective in front of the projection gate being of greater focal length and aperture than that in front of the exposure gate and an auxiliary shutter in front of said projection gate.

11. Apparatus for the taking and projection of motion pictures and comprising an exposure gate and a projection gate in alignment, a common pulldown mechanism for drawing film through both gates in succession, a common rotary shutter having different apertures adapted to pass in front of the respective gates, an objective in front of each gate, means cooperating with the projection gate whereby that gate only may be illuminated for the projection of images therein through the corresponding objective, and an auxiliary shutter in front of said projection gate.

12. Apparatus for the taking and projection of motion pictures, and comprising an exposure gate and a projection gate having fields of the same area, and arranged in alignment and separated by a multiple of the height of such area, a common pulldown mechanism for drawing a single strip of film past both gates in succession, an objective in front of each gate, the objective in front of the projection gate being of greater focal length and aperture than the other, a common rotary shutter in front of both gates, and means for illuminating the projection gate only.

Signed at Rochester, New York, this 21st day of Dec. 1922.

JOHN G. CAPSTAFF.